C. G. SMITH.
MAGNETIC SPEEDOMETER.
APPLICATION FILED DEC. 24, 1918.
1,312,083. Patented Aug. 5, 1919.
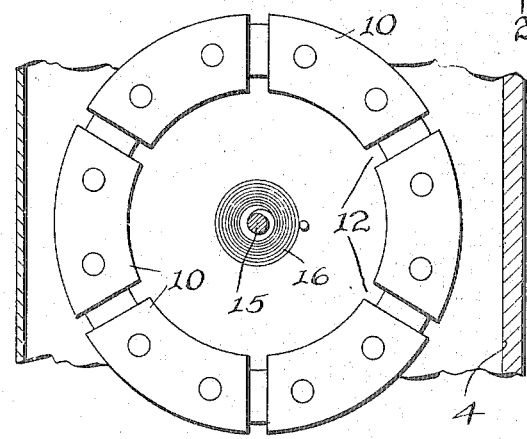
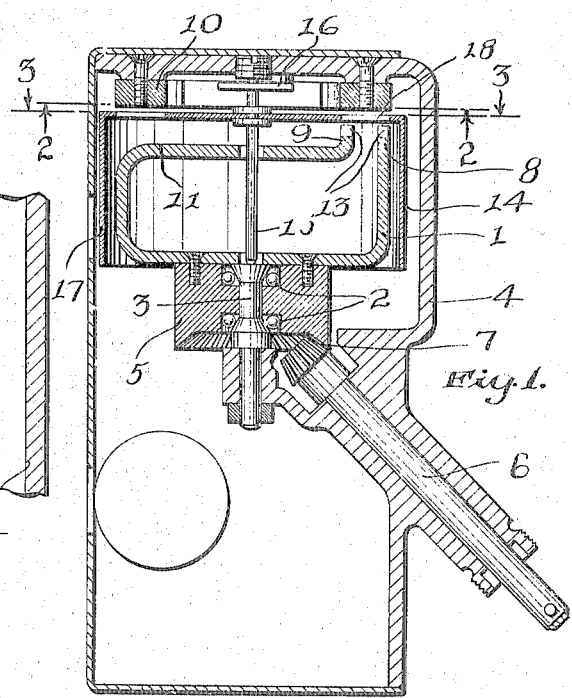
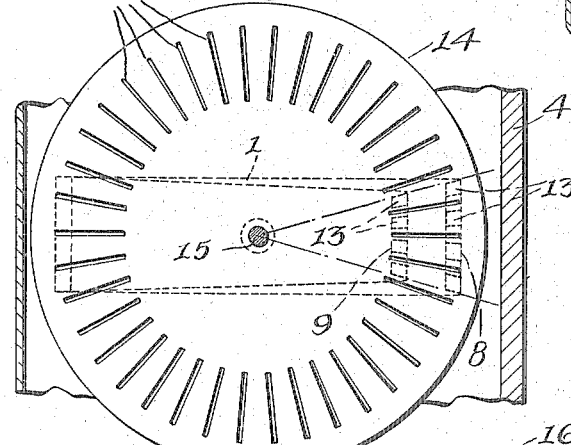
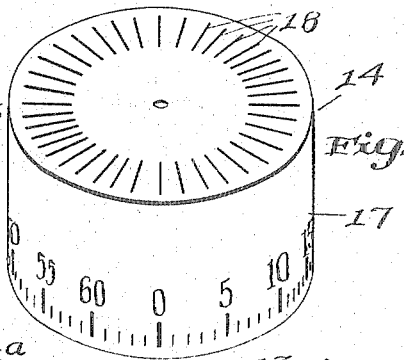
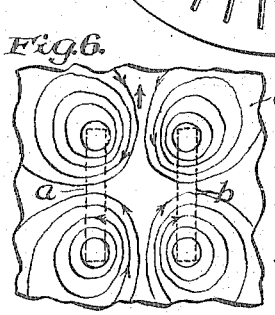
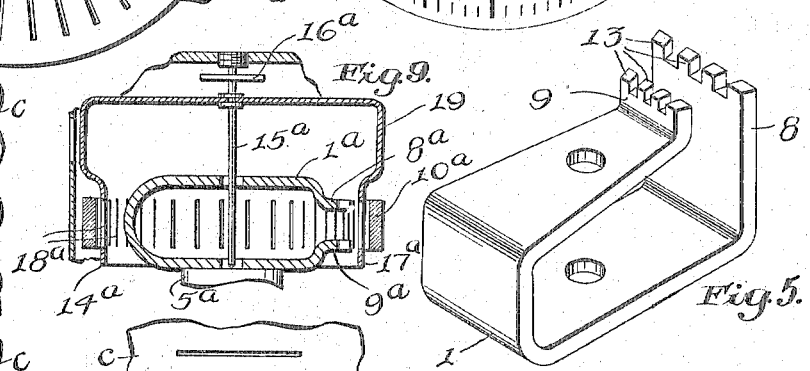
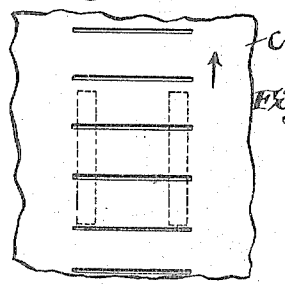
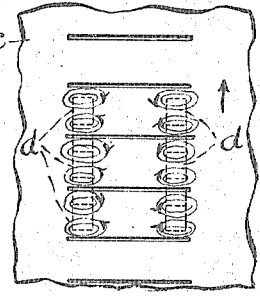
INVENTOR
Charles G. Smith
BY
W. F. Bissing
ATTORNEY

UNITED STATES PATENT OFFICE.

CHARLES G. SMITH, OF WASHINGTON, DISTRICT OF COLUMBIA, ASSIGNOR TO CHARLES FISCHER, OF BROOKLYN, NEW YORK.

MAGNETIC SPEEDOMETER.

1,312,083.     Specification of Letters Patent.     Patented Aug. 5, 1919.

Application filed December 24, 1918. Serial No. 268,198.

*To all whom it may concern:*

Be it known that I, CHARLES G. SMITH, a citizen of the United States, and a resident of Washington, District of Columbia, have invented certain new and useful Improvements in Magnetic Speedometers, of which the following is a specification.

In my prior Patent, No. 1,207,647, dated December 5, 1916, I have disclosed and claimed a magnetic speedometer wherein a rotating member of the magnetic circuit is provided with concentrating teeth magnetized at or above saturation, whereby variations may take place in the general magnetic field without affecting the torque and consequently the accuracy of the instrument. My copending application, Serial No. 248,983, filed August 8, 1918, covers generically another embodiment of this principle, in which the magnet rotates with its north and south poles on opposite sides of the axis of rotation, and the conductor is slotted transversely to the direction of rotation, in such manner as to suppress eddy currents due to the poles, which currents would have to travel around the slots, while permitting generation of eddy currents by the teeth within the regions between the slots. The said application shows a form wherein the armature is stationary and the concentrating teeth are upon the poles of the magnet. In another, specific application, Serial No. 248,984, filed August 8, 1918, I have illustrated the fact that the armature may also rotate, and in that event may carry the concentrating teeth.

The present application presents another improved speedometer which preferably embodies the principles of my patent and applications aforesaid. In the present construction the magnet is so formed and arranged as to present both its poles at the same side of the axis of rotation, and the conductor is slotted so that the E. M. F.'s of the poles neutralize each other in the endeavor to force currents in opposite directions around the slots, while the concentrating teeth set up eddy currents in the regions between the slots. In this case it is not necessary to extend the slots to an edge of the conductor, and they are accordingly preferably closed at both ends. The concentrating teeth may be placed upon the magnet or upon another rotating member of the magnetic circuit.

In the drawings forming a part hereof:

Figure 1 is a vertical longitudinal section through the body of the speedometer;

Fig. 2 is a horizontal cross-section on the line 2—2 of Fig. 1 looking in the direction of the arrow and showing the fixed armature;

Fig. 3 is a horizontal cross-section on the line 3—3 of Fig. 1, looking in the direction of the arrow and showing the conducting cup;

Fig. 4 is a perspective view of the conducting cup;

Fig. 5 is a perspective view of the horseshoe magnet;

Fig. 6 is a diagrammatic view showing the production of eddy currents with plain poles;

Fig. 7 is a diagrammatic view illustrating the action of a slotted conductor passing over plain poles;

Fig. 8 is a diagrammatic view illustrating the action of the concentrating teeth in connection with a slotted conductor moving over them; and Fig. 9 is a cross-sectional view of a modified form of the invention.

In Figs. 1 to 5, the magnet 1 is supported by a ball-bearing 2 to rotate about a vertical axle 3 in a case 4, the hub 5 whereon the magnet is mounted being driven by a suitable shaft and gearing 6, 7.

The magnet is of the horseshoe type and is disposed transversely to the axis of rotation, with its poles 8, 9 adjacent each other at the same side of the axis. In this form, the poles are presented vertically, or parallel with the axis of rotation. The armature 10 is preferably, though not necessarily, stationary, extending circularly above the magnet in the form of a disk or annulus.

In order to prevent magnetic short-circuiting at the point 11, this armature may be made of sector-like pieces separated by air gaps 12, so that the armature has high reluctance circumferentially and low reluctance radially in the path between the poles. The number and size of the sections may be varied from approximately the proportions shown to laminations. The width of the air gaps may also be varied. If the distance between the point 11 and the armature is sufficient, it is unnecessary to section the armature, which may then be an integral ring.

With a stationary armature, the concentrating teeth 13 are placed upon the poles of the magnet. These teeth may be laminated in the manner and for the purpose set forth in my aforesaid applications.

The oscillatory conductor 14 consists of a cup rotatably supported by a staff 15 and restrained by a spring 16, its top or disk being interposed between the poles of the magnet and the armature, and its skirt flange 17 surrounding the magnet being adapted to receive numerals to serve as the indicator. The disk is provided with radial slots 18, which need extend only opposite and between the poles and both ends of which are therefore closed. The slots are preferably only wide enough to prevent current flowing across them, and the regions between the slots are wider (in the circumferential direction) than the concentrating teeth and much narrower than the poles. The regions are preferably about twice the width of the teeth.

In operation, the traveling poles create substantially equal and opposing E. M. F.'s, which produce practically no currents, because these currents would have to flow in opposite directions around the slots. The concentrating teeth, however, generate eddy currents side by side within the regions, and the torque is due to these currents. The teeth are preferably magnetized at or above saturation, so that the torque is, within a substantial or sufficient range, independent of variations in the field.

The effect of the slotting in connection with adjacent poles having concentrating teeth will be readily understood from the diagrams. Fig. 6 shows two plain poles, $a$ and $b$, of opposite polarity, traveling in the direction of the arrow relative to a conductor plate or disk $c$ having no slots. Eddy currents are generated by the poles substantially as indicated. If now we still maintain smooth pole faces and slot the conductor transverse to the direction of movement, as in Fig. 7, there will be, practically speaking, no eddy currents, for in each adjacent bar there are equal and opposing E. M. F.'s. In Fig. 6 these equal and opposing E. M. F.'s forced the current into streams flowing inward between the poles. The slots in Fig. 7 prevent such flow. Fig. 8 shows concentrating teeth $d$ upon the poles of Fig. 7, these teeth being narrower than the bars or regions of the conductor between the slots. As before, there can be no general eddy currents due to the poles as a whole, but local eddy currents may flow within the bars, as indicated.

As a matter of fact, due to leakage, the opposing E. M. F.'s of the poles will not be absolutely equal, and there will consequently be some slight current due to the difference, but this may be neglected, because torque is proportional to the square of the magnetic field, and the square of the difference between the fields of the two poles is inconsiderable as compared with the square of the total flux of the teeth. Consequently the effect of the teeth will so greatly preponderate over the smooth pole face effect that the latter for practical purposes may be ignored.

In order that the poles may neutralize each other, as just stated, their areas should be proportional to their distances from the axis of rotation. This may be effected by making their circumferential extents equal to the arcs included between a pair of radii.

In Fig. 9 similar parts are designated by the same numerals as before with super-character $a$. The magnet $1^a$ in this form presents its poles $8^a$, $9^a$ radially. They are at the same distance from the center and therefore of equal area. The armature $10^a$ is an annulus surrounding the magnet, having its laminations disposed vertically. The conductor member $14^a$ has its slots $18^a$ in its vertical flange $17^a$. The indicator characters may be borne upon a crown 19 enlarged to overhang the armature and stand close to a window in the case.

What I claim as new is:

1. A magnetic speedometer, comprising a rotary magnet having its north and south poles adjacent to each other and at the same side of the axis of rotation, an armature, one of the members of the magnetic circuit being provided with concentrating teeth which revolve about the axis, and an oscillatory conductor slotted transversely to the direction of rotation, whereby the opposing electromotive forces of the poles neutralize each other whereas the teeth set up eddy currents within the regions between the slots.

2. A magnetic speedometer, comprising a rotary magnet having its north and south poles adjacent to each other and at the same side of the axis of rotation, an armature, one of the members of the magnetic circuit being provided with concentrating teeth which revolve about the axis, and an oscillatory conductor slotted transversely to the direction of rotation, the regions of the conductor between the slots being greater in width than the teeth and less than the poles.

3. A magnetic speedometer, comprising a rotary magnet having its north and south poles adjacent to each other and at the same side of the axis of rotation, an armature, one of the members of the magnetic circuit being provided with concentrating teeth which revolve about the axis, and an oscillatory conductor slotted transversely to the direction of rotation, the regions of the conductor between the slots being greater in width than the teeth and less than the poles and the slots being closed at both ends.

4. A magnetic speedometer, comprising a rotary horseshoe magnet having both its poles at the same side of the axis of rotation and provided with concentrating teeth, an armature, and an oscillatory conductor provided with slots extending transversely to the direction of rotation opposite and between the poles, the slots being narrow and the regions between them being wider than the teeth but narrower than the poles.

5. A magnetic speedometer, comprising a rotary magnet having its north and south poles adjacent to each other and at the same side of the axis of rotation, said poles being presented substantially parallel with the axis and at different distances therefrom and having their areas proportional to such distances, an armature, one of the members of the magnetic circuit being provided with concentrating teeth which revolve about the axis, and an oscillatory conductor slotted transversely to the direction of rotation, as and for the purpose set forth.

6. A magnetic speedometer, comprising a rotary magnet having its north and south poles adjacent to each other and at the same side of the axis of rotation, said poles being at different distances from the axis of rotation and having their areas proportional to such distances, an armature, one of the members of the magnetic circuit being provided with concentrating teeth which revolve about the axis, and an oscillatory conductor slotted transversely to the direction of rotation, as and for the purpose set forth.

7. A magnetic speedometer, comprising a rotary magnet having its north and south poles adjacent to each other and at the same side of the axis of rotation and provided with concentrating teeth, a stationary circularly extending armature composed of laminae disposed transversely to the direction of rotation so as to have high reluctance in the circumferential direction, and an oscillatory slotted conductor, as and for the purpose set forth.

In testimony whereof, I have signed my name to this specification.

CHARLES G. SMITH.